United States Patent
Clark (10) Patent No.: US 12,204,311 B2
(45) Date of Patent: Jan. 21, 2025

(54) SYSTEM AND SERVER FOR PERFORMING PRODUCT TRACING AND COMPLEX INTERLOCKING IN A PROCESS CONTROL SYSTEM

(71) Applicant: AVEVA SOFTWARE, LLC, Lake Forest, CA (US)

(72) Inventor: Scott William Clark, Melbourne (AU)

(73) Assignee: Aveva Software, LLC, Lake Forest, CA (US)

( * ) Notice: Subject to any disclaimer, the term of this patent is extended or adjusted under 35 U.S.C. 154(b) by 108 days.

(21) Appl. No.: 17/505,989

(22) Filed: Oct. 20, 2021

(65) Prior Publication Data
US 2022/0128969 A1 Apr. 28, 2022

Related U.S. Application Data

(60) Provisional application No. 63/104,209, filed on Oct. 22, 2020.

(51) Int. Cl.
G05B 19/4097 (2006.01)

(52) U.S. Cl.
CPC ............ *G05B 19/4097* (2013.01); *G05B 2219/32359* (2013.01)

(58) Field of Classification Search
None
See application file for complete search history.

(56) References Cited

U.S. PATENT DOCUMENTS

| | | | | |
|---|---|---|---|---|
| 5,603,018 A | * | 2/1997 | Terada | G06F 8/34 |
| | | | | 707/999.001 |
| 5,808,905 A | * | 9/1998 | Normann | G06F 30/18 |
| | | | | 703/2 |
| 6,633,782 B1 | * | 10/2003 | Schleiss | G05B 23/0229 |
| | | | | 700/86 |
| 7,761,270 B2 | * | 7/2010 | Banki | G01V 11/00 |
| | | | | 703/10 |
| 9,261,869 B2 | * | 2/2016 | Cheng | G06F 30/23 |
| 9,395,713 B2 | * | 7/2016 | Grigoryev | G05B 19/4069 |
| 10,296,164 B2 | * | 5/2019 | Strinden | G05B 19/10 |
| 2002/0193888 A1 | * | 12/2002 | Wewalaarachchi | |
| | | | | G05B 23/0208 |
| | | | | 700/20 |

(Continued)

FOREIGN PATENT DOCUMENTS

EP 1358619 B1 11/2007
WO 2007/022289 A2 2/2007

*Primary Examiner* — Jason Lin
(74) *Attorney, Agent, or Firm* — Dergosits & Noah LLP; Todd A. Noah (57) ABSTRACT

The disclosure is directed to a novel system and methods for modeling process components using segmental analysis. As opposed to analyzing the entire system at once, each element representing a process component is assigned parameter inputs that enable the system to determine a current state. Changes in the element's parameter inputs are fed in a bi-directional manner to other elements connected by segments where the other elements use the parameter inputs to determine a predictive or current process condition that are used as new parameter inputs for the next element. In some embodiments, the system allows for the prevention of component state change with only a portion of the entire process being solved, as abnormal conditions can be detected without solving for the entire system.

20 Claims, 9 Drawing Sheets

(56) References Cited

U.S. PATENT DOCUMENTS

| | | | |
|---|---|---|---|
| 2003/0014500 A1* | 1/2003 | Schleiss | G06Q 10/06 709/218 |
| 2004/0075689 A1* | 4/2004 | Schleiss | G05B 19/0428 715/771 |
| 2007/0168065 A1* | 7/2007 | Nixon | G06F 9/451 715/965 |
| 2008/0255892 A1 | 10/2008 | Orangi et al. | |
| 2010/0299122 A1 | 11/2010 | Golinveaux et al. | |
| 2012/0199647 A1* | 8/2012 | Hwang | G06Q 10/087 235/494 |
| 2015/0106075 A1* | 4/2015 | Boys | G05B 17/02 703/9 |
| 2016/0154907 A1 | 6/2016 | Halabe et al. | |
| 2016/0196484 A1* | 7/2016 | Ciavatta | G06K 19/06037 235/462.1 |
| 2018/0074469 A1* | 3/2018 | Ishizaka | G06K 19/06037 |
| 2021/0357084 A1* | 11/2021 | Jundt | G06F 3/0486 |

\* cited by examiner

SYSTEM AND SERVER FOR PERFORMING PRODUCT TRACING AND COMPLEX INTERLOCKING IN A PROCESS CONTROL SYSTEM

CROSS REFERENCE TO RELATED APPLICATIONS

This application claims the benefit of and priority to U.S. Provisional Patent Application No. 63/104,209, filed Oct. 22, 2020, the entire contents of which are incorporated by reference herein.

BACKGROUND

Conventional processes include pipelines and other networks that move and store products over large distances. Some products that are moved and stored include fluids, liquids, solids, gasses, or a combination thereof. Such processes can include multiple components such as tanks or other storage devices to store product, pipelines to deliver products to locations within an area of industrial facility, drains, outlets, inlets, valves, junctions to connect two or more pipelines together, interlocks, as well as other passive and active components such as T-shaped and other connections and manifolds. As a product moves throughout a process network, the process network can exhibit changes in process parameters such as pressure, flow, and/or temperature.

Currently, processes are typically monitored by receiving actual data directly from a sensor. To model the process, large systems of equations are used that must be simultaneously solved. However, one problem with this modeling technique is that is does not allow only a portion of the process model to be analyzed. That is, all variables must be known for all components before the model can converge on a solution. This type of analysis uses a large amount of computer resources and is not a reliable way to monitor the system for potential excursions resulting from a wide variety of conditions including an improper line-up as just one example.

Therefore, there is a need in the art for a system that can analyze a portion of a system and make accurate predictions on the effect of the overall system due to a change in a component's state.

SUMMARY

Some embodiments of the system are directed to a method of analyzing a process (e.g., industrial, manufacturing, factory, etc.) using segmental analysis which analyzes an element and sends the results to adjacent elements connected by segments which use the results in that element's analysis. In some embodiments, this method allows the process model to predict the outcome of actuating a process component (e.g., valve, pump) before the actuation occurs. Some embodiments of the systems and methods described herein are useful to predict the outcome of plant modifications and also are able to model the effects of components on the overall system even when those components lack sensors. For example, a tank may need to be filled though a manifold, but a manifold valve leading to another tank may be open according to some embodiments. Only being able to see that that valve is open because of a connection to a PLC, but not knowing an actual pressure in the line because there is no pressure gauge, a theoretical pressure in the line at the valve can be determined by the system using the level in the tank. This theoretical value can be assigned to the valve as an input parameter which can be referenced by the system to interlock one or more components where a change in state may cause an excursion if the pressure at the valve was too low. By analyzing each element at the element, and then sending the results of that analysis to an adjacent element connected by a segment, the system can solve for part of the system without the need to analyze the entire system all at once according to some embodiments.

In addition, in some embodiments, the system is also configured to reference operational tables to determine the state of a component represented by an element that is several elements removed from an element receiving a state change command. In some embodiments, the system is configured to execute transactions that include the actuation of several elements at once. In some embodiments, if one or more elements fail to actuate as expected, the system is configured to determine a theoretical resulting process scenario (e.g., flow direction, pressure) from the resulting abnormal line-up. In some embodiments, in addition to predictive models from process calculations, the system is configured to check an operational table for the actual state of all components in the transaction associated with a transaction ID. In some embodiments, if the actual state does not match an expected state, the system is configured to prevent a component state change and/or revert a component state back to its original position and/or failsafe position. In some embodiments, the excursion is averted in this respect, while the results of the theoretical calculation can be stored in a historical data base and associated with the transaction ID.

In some embodiments, the system is effective for detecting unsafe and/or unwanted product flows through the process; automatic interlocking to prevent such unwanted or unsafe product flows; automatic animation of an HMI/GUI's display(s) of the process as product flows change; and/or automatic detection of anomalous process parameters, such as actual pressure(s) deviating from theoretical.

In some embodiments, the system comprises one or more computers comprising one or more processors and one or more computer readable media, the one or more computer readable media comprising instructions stored thereon that when executed cause the one or more computers to implement one or more aspects of the instructions. In some embodiments, the instructions cause the one or more computers to: create, by the one or more processors, a graphical user interface (GUI) comprising a simulation canvas; display, by the one or more processors, a model library comprising one or more model objects comprising one or more elements and/or one or more segments selectable by the user via the GUI; import, by the one or more processors, a selection of the one or more elements and/or the at least one or more segments from the model library to the simulation canvas; enable, by the one or more processors, a connection of the one or more segments to the one or more elements on the simulation canvas; wherein each of the one or more elements are configured to send one or more parameter inputs to another element connected by a segment.

In some embodiments, each of the one or more elements are configured to receive one or more parameter inputs from an element connected by a segment. In some embodiments, each of the one or more elements are configured to receive one or more parameter inputs only from an element directly connected by a segment. In some embodiments, the one or more parameter inputs comprise one or more links configured to enable a user to connect the one or more model objects to a theoretical analyzer.

In some embodiments, the instructions further cause the one or more computers to: generate, by the one or more processors, a theoretical analyzer. In some embodiments, the theoretical analyzer is configured to use parameter data from the one or more parameter inputs to predict a theoretical result of a theoretical change in state of a process component linked to at least one of the one or more elements. In some embodiments, the theoretical change in state is the result of a user actuating at least one of the one or more elements via the graphical user interface.

In some embodiments, the system is configured to compare the theoretical result to an operational parameter which can be a single parameter or a range of values of the parameter (both single and the range being referred to herein as a single parameter for simplicity.) In some embodiments, the system is configured to prevent a state change of the at least one of the one or more elements if the theoretical result is outside of the operational parameter. In some embodiments, the one or more parameter inputs comprise one or more actual inputs. In some embodiments, the one or more actual inputs comprise one or more links configured to enable a user to connect the one or more model objects to one or more monitoring systems.

In some embodiments, the system is configured to compare the one or more actual inputs to an operational parameter. In some embodiments, the system is configured to prevent a state change of the at least one of the one or more elements if the one or more actual inputs are outside of the operational parameter. In some embodiments, the theoretical result comprises one or more of a pressure, a temperature, a flowrate, and a flow direction.

In some embodiments, the one or more elements comprise a first element, a second element, and a third element. In some embodiments, the one or more elements comprise a first segment and a second segment. In some embodiments, when the first element is connected to the second element by the first segment, the second element is connected to the third element by the second segment, and the first element and third element are not directly connected by a segment, the system is configured to send first element input parameters to the second element but not the third element.

In some embodiments, the instructions are further configured to cause the one or more computers to: create, by the one or more processors, an operational table; send, by the one or more processors, an actual component state for each respective component of the one or more elements to the operational table; compare, by the one or more processors, each actual component state to an expected component state for a state change command; and prevent, by the one or more processors, the actuation command if one or more actual component states do not match an expected component state for the actuation command.

In some embodiments, the first element includes a first actual component state. In some embodiments, the third element includes a third actual component state. In some embodiments, upon a state change attempt of the first element the system is configured to transmit the one or more input parameters to the second element connected to the first segment and compare the third actual component state to a third expected component state by using the operational table. In some embodiments, the theoretical analyzer is configured to send the theoretical result to other elements connected to the actuated element by adjoining segments before analyzing any other element of the process model.

In some embodiments, the system is configured to enable a state change attempt of multiple elements at once with a transaction command. In some embodiments, the transaction command comprises a transaction identification. In some embodiments, each of the multiple elements associated with the transaction command at share at least a part of the transaction identification. In some embodiments, the system is configured to check an operational table for an actual state of the multiple elements that share at least a part of the transaction identification. In some embodiments, the system is configured to check an operational table at one or more of before, during, and after the actuation command has been made. In some embodiments, the system is configured to prevent a component state from changing and/or revert a current component state back to a previous component state if the actual state does not match an expected state.

In some embodiments, the theoretical calculator is configured to calculate one or more theoretical conditions of the one or more model objects based at least in part on sensor data received by the one or more sensors and/or one or more physical attributes of the one or more model objects. In some embodiments, one or more physical attributes includes a first object height relative to a second object. In some embodiments, the theoretical calculator is configured to calculate a theoretical condition of the model object based at least in part on model data received by another model object. In some embodiments, the model data comprises one or more of an actual condition and a theoretical condition. In some embodiments, a theoretical condition comprises one or more of a pressure, a temperature, a flowrate, and a flow direction.

In some embodiments, the one or more parameter inputs comprises an interlock input. In some embodiments, the interlock input is configured to enable a user to set an interlock condition. In some embodiments, the interlock condition comprises one or more interlock values. In some embodiments, the one or more interlock values comprise a minimum interlock value, a maximum interlock value, and/or an operating range. In some embodiments, the system is configured to interlock one or more model objects' components based on the interlock condition. In some embodiments, the one or more interlock values are derived at least in part from a theoretical calculation. In some embodiments, the one or more interlock values are derived at least in part from an actual condition. In some embodiments, the one or more interlock values are derived at least in part from a combination of the actual condition and the theoretical calculation.

Further aspects of the system will become apparent from the detailed description and accompanied drawings.

DETAILED DESCRIPTION

The following is a description and accompanied illustration of some embodiments of the system. It is understood that the detailed description is not an all-inclusive representation of all aspects of the entire system and is only intended as an aid for those of ordinary skill to make and use some embodiments of the system. Some system features described herein are not included in the non-limiting example illustrated in the figures but are understood to be readily incorporated into the system as determined necessary to meet predetermined criteria. Any features described herein according to some embodiments can be readily combinable with each other without departing from the scope of the disclosure.

Figure 1:
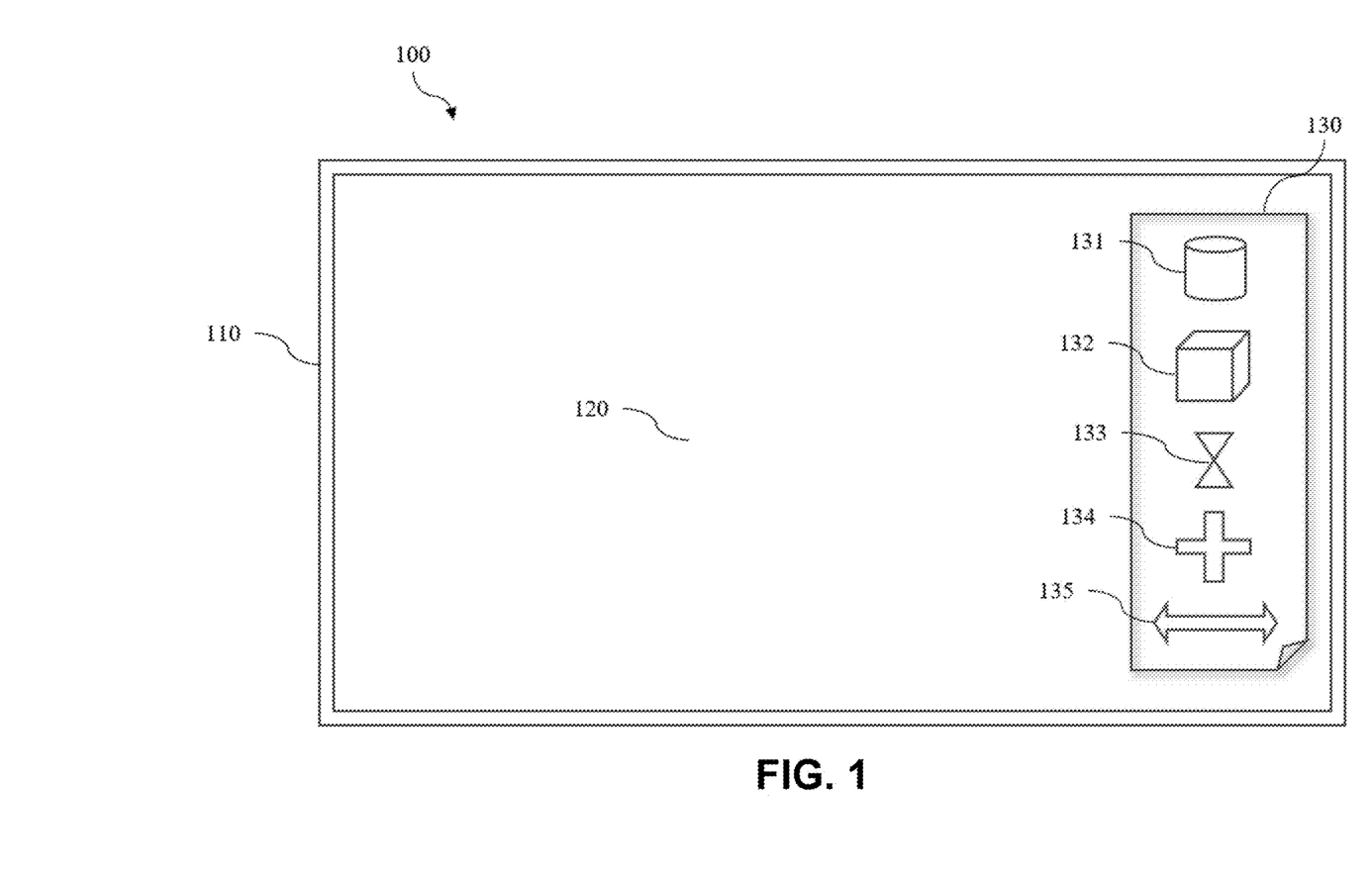
FIG. 1 shows a non-limiting example of a simplified graphical user interface (GUI) according to some embodiments.

FIG. 1 shows a non-limiting example of a simplified graphical user interface (GUI) according to some embodiments. In some embodiments, the GUI 110 includes a simulation canvas 120 and a model library 130. In some embodiments, the model library 130 includes a plurality of model objects 131-135. The model objects 131-135 can be any conventional object used to represent process flow and/or associated with object-oriented programming according to some embodiments. The model objects can be illustrations of and/or representations manufacturing process components such as valves, pumps, tanks, presses, conveyors, shredders, pipes, wires, sensors, manifolds, and ovens as non-limiting examples according to some embodiments. In some embodiments, a reference to the attempted change in state of an element is also a reference to the attempted change in state of the corresponding component.

In some embodiments, the plurality of model objects 131-135 may comprise one or more elements 131-134 and/or one or more segments 135. The one or more elements 131-134 are configured to represent dynamic components in a process flow that have physical attributes that can be changed (e.g., pumps, valves, powered conveyors, etc.). In some embodiments, one or more elements 131-134 represent static components in the process flow that are not generally manipulated under normal operating conditions but serve to connect two or more elements (e.g., pipes, wires, conduit, non-powered conveyors, etc.). For instance, element 131 may include a tank element 131, element 132 may include a pump element 132, 133 may include a valve element 133, and element 134 may be a manifold element 134 according to some embodiments. Manifold element 134 may not be a directly powered element in some embodiments, but it serves to combine the effects of multiple elements. The one or more segments 135 connect two or more elements together, and upon the connection, configure one or more computers to execute one or more instructions for analyzing the system as described herein.

Figure 2:
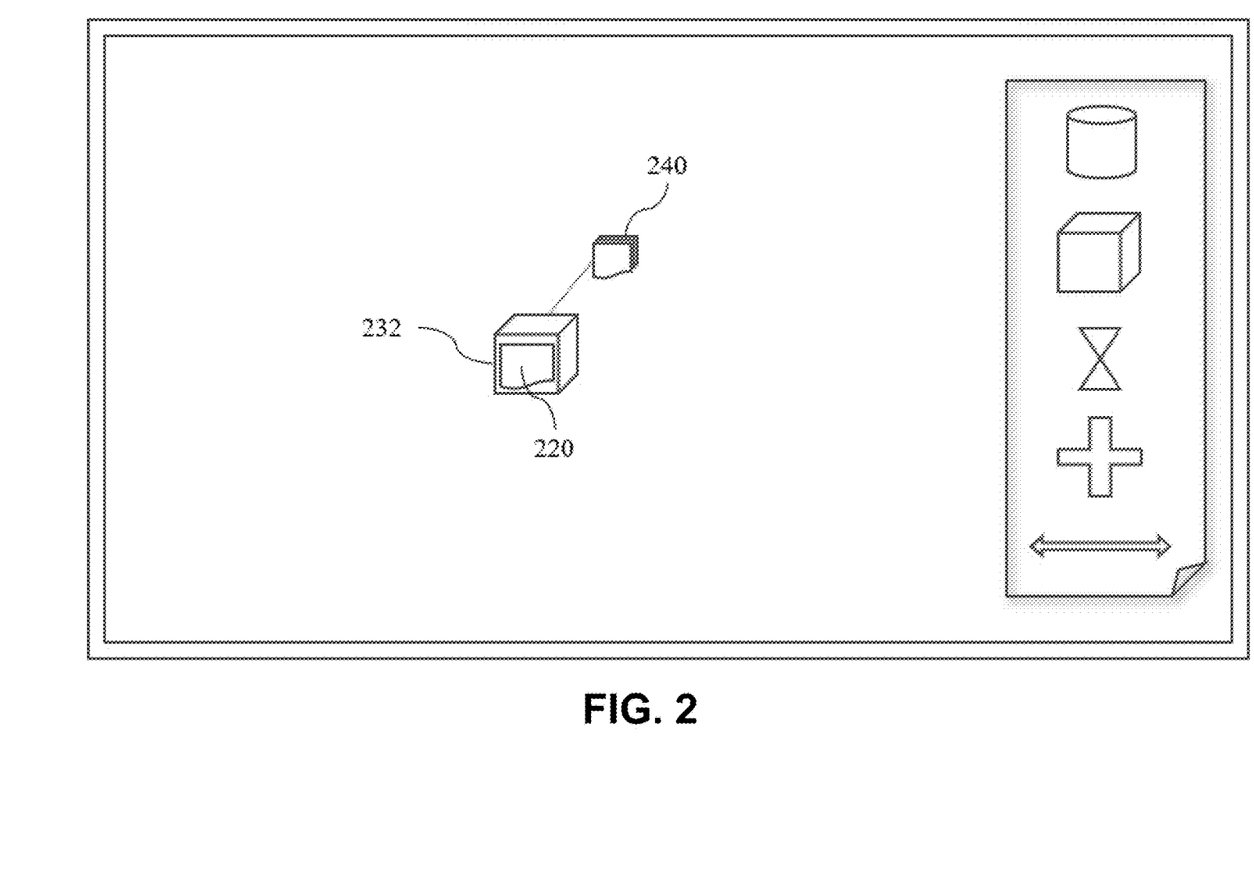
FIG. 2 depicts a pump element imported onto the simulation canvas according to some embodiments.

FIG. 2 depicts a pump element 232 imported onto the simulation canvas 120 according to some embodiments. In some embodiments, the GUI 110 is configured to enable a user to configure one or more parameter inputs 240. In some embodiments, the one or more parameter inputs 240 include one or more actual inputs, one or more transmitted inputs, one or more historical inputs, and/or one or more theoretical inputs.

In some embodiments, the one or more actual inputs are configured to enable a user to link an element to a component's monitoring system (e.g., a sensor, camera, and/or any conventional system configured to send an electronic signal representative of a component's measured parameter). In some embodiments, a plurality of components may be connected to form a process (e.g., a manufacturing environment, factories, etc.)

In some embodiments, the system is configured to send one or more parameter inputs to a theoretical analyzer comprising measurement calculation computer code, artificial intelligence, statistical analysis code, and/or any conventional process analysis software. In some embodiments, one or more theoretical inputs are configured to enable the user to input physical characteristics (e.g., height, viscosity, and/or any physical attribute) of the process component being modeled for use in theoretical calculations by the theoretical analyzer. In some embodiments, the physical characteristics are then fed to the theoretical analyzer and associated with the element as a theoretical value, as further described herein. In some embodiments, the system is configured to display and/or edit both the actual inputs and theoretical inputs associated with each element in a parameter display 220, which may be toggled on and off as desired. In some embodiments, machine learning techniques can be used to analyze where actual process data values are always or currently unavailable and automatically send data to the theoretical analyzer.

One benefit of allowing theoretical inputs to be fed into the system is that it allows the calculation of actual physical parameters at a segment endpoint without the use of sensors at the location being measured according to some embodiments. For example, by inputting a density and height, the system is configured to determine a resulting pressure according to some embodiments. In some embodiments, one or more theoretical inputs include an equation.

Figure 3:
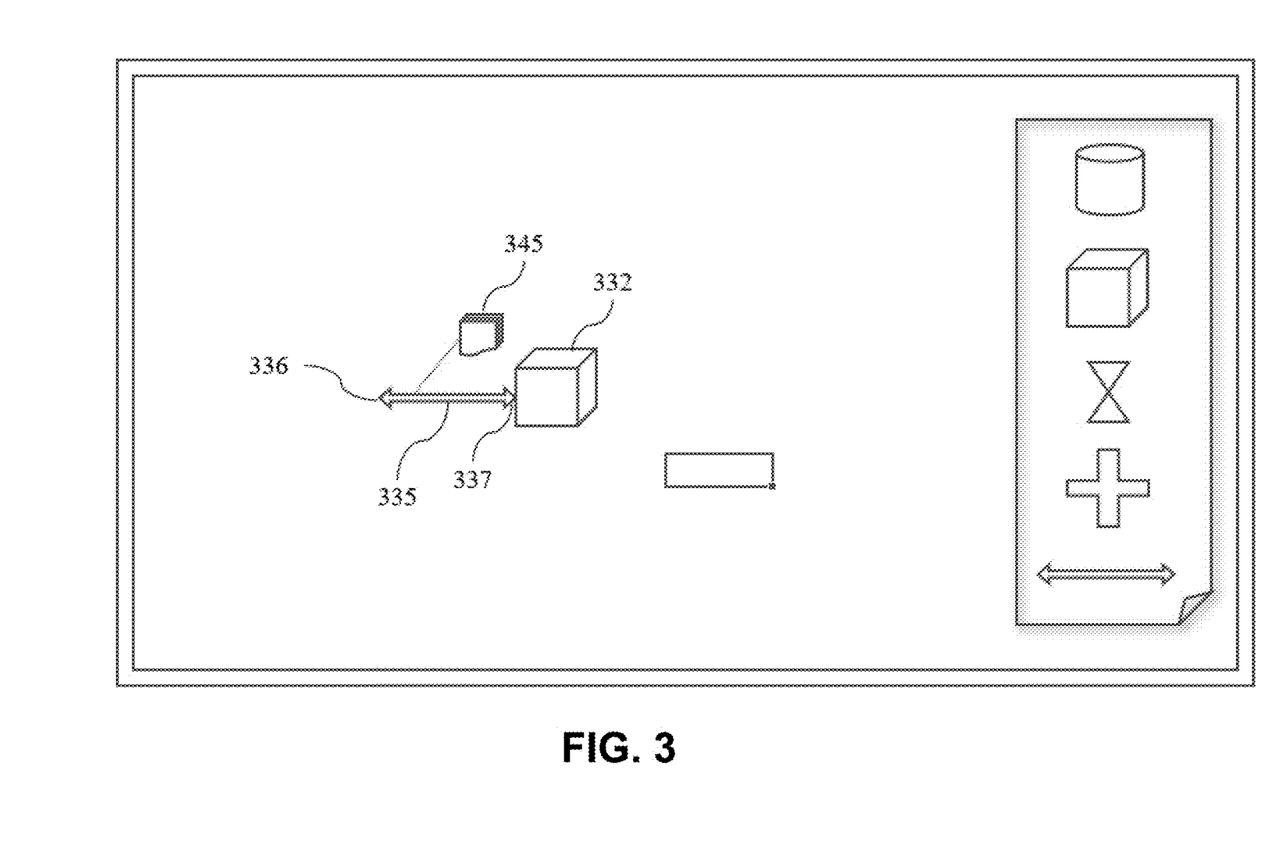
FIG. 3 shows the addition of a segment to a pump element according to some embodiments.

FIG. 3 shows the addition of a segment 335 to a pump element 332 according to some embodiments. In some embodiments, the GUI is configured to enable the segment 335 to have one or more parameter inputs 345 associated therewith as described above. In some embodiments, this is an atypical situation which causes the segment 335 to act as an element but is a useful feature where a process component's physical characteristics can be subject to outside influence that has an overall effect on the system.

In some embodiments, upon connection of the segment 335 to the pump element 332 the system is configured to send one or more parameter inputs from an element connected to a first end 336 to an element 332 connected at the second end 337. As shown in FIG. 3, there is no element connected to the first end 336, and therefore the pump element 332 will receive zero input at the second end 337 according to some embodiments. As a non-limiting example, if the pump component represented by the pump element 332 has no gauges or sensors, and no parameter inputs have been entered, then the system will not display any relevant values associated with the pump element 332 because there are no parameter inputs being fed from a connected element.

Figure 4:
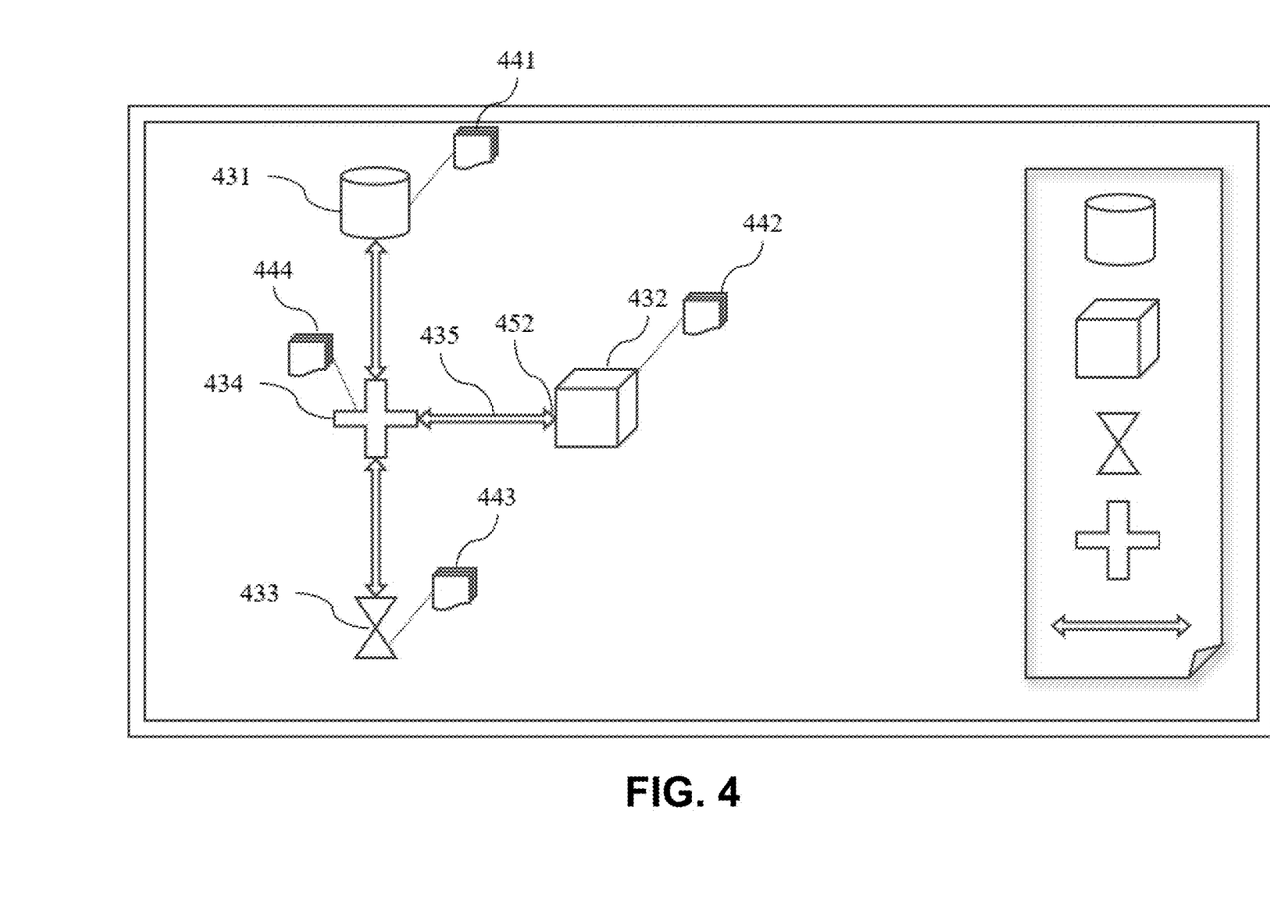
FIG. 4 illustrates a simulation canvas with a tank element, a manifold element, and a valve element imported into the simulated canvas in addition to a pump element.

FIG. 4 illustrates a simulation canvas 120 with a tank element 431, a manifold element 434, and a valve element 433 imported into the simulated canvas 120 in addition to a pump element 432. In some embodiments, as a non-limiting example, the tank element 431 may have one or more level sensor feeding level data as an actual input into parameter input 441. In some embodiments, the valve element 433 itself may include one or more theoretical inputs (e.g., resistance, pressure drops) and actual inputs (e.g., valve position) associated with parameter input 443.

Manifold element 434 may also have one or more parameter inputs 444, which is useful if the inputs to the manifold comprise different diameter pipes, as a non-limiting example according to some embodiments. In some embodiments, the system is configured to calculate the combined effects of multiple inputs from adjacent elements into manifold element 434 automatically upon connection with a segment. In some embodiments, in addition to actual and theoretical inputs, the pump parameter input 442 includes a transmitted input from segment 435. In some embodiments, the transmitted input received from segment 435 includes a combination of tank parameter inputs 441 and valve parameter inputs 443. In some embodiments, the transmitted input comprises theoretical values calculated using the tank parameter inputs 441 and valve parameter inputs 443.

While under steady state conditions, a transmitted input based on a theoretical value may be the same as an actual value received by a sensor, but predictions to changes in the system as a result of an attempted manipulation of an actual component are improved by the analysis methods disclosed herein according to some embodiments. In some embodiments, an example first condition may comprise where the pump element 432 is off, the tank element 431 is empty, and the valve element 433 is closed. In this first condition, a theoretical pressure realized at a pump element outlet 452 may be zero. In some embodiments, when an operator toggles the pump component on, the system is configured to calculate the results of the pump initiation by using the theoretical calculated values from the manifold element 434. In some embodiments, wherein the tank component represented by the tank element 431 is at a certain level above the pump element 432 and/or manifold element 434, the manifold element 434 receives a theoretical pressure value as a result of the height difference. In some embodiments, the theoretical analyzer causes the manifold element to send the theoretical pressure to the valve element 433. In some embodiments, each segment allows data to be transmitted in both directions, so the manifold element combines the pressure from the valve element and the tank height difference which in this case is the same. This combined pressure data is then delivered to pump element 432 where it is compared to operational setpoints (e.g., interlock setpoints). In some embodiments, as a non-limiting example, the pump element 432 expects to see a positive head pressure greater than or equal to the theoretical value, so no interlock occurs.

In a second condition, may comprise where the pump element 432 is off, the tank element 431 is empty, and the valve element 433 is open. In this second condition, a theoretical pressure realized at a pump element outlet 452 may be zero. In some embodiments, when an operator toggles the pump component on, the system is configured to calculate the results of the pump initiation by using the theoretical calculated values from the manifold element 434 as described above. However, with the valve element 433 open, the theoretical analyzer determines that the manifold element 434 is less than the expected head pressure because the valve component being open allows all fluid to exit the process (assuming valve element 433 represents a drain valve). The tank element 431 contributes no pressure to manifold element 434 because it is empty. This combined theoretical value is sent back the pump element 432 where it is compared to an operational setpoint, which in this case, interlocks the pump.

In some embodiments, the value in this functionality is that components can be modeled before installation and/or without the use of sensors. In addition, the system uses fewer computer resources than a typical process simulation as not every node in the system needs to be analyzed to determine results according to some embodiments. In some embodiments, the values used for the theoretical analysis only comes from elements directly connected by segments. Therefore, if a valve is closed, for example, or a pump is off, the entire system does not need to be analyzed to determine process conditions at the next downstream and/or upstream element according to some embodiments.

Figure 5:
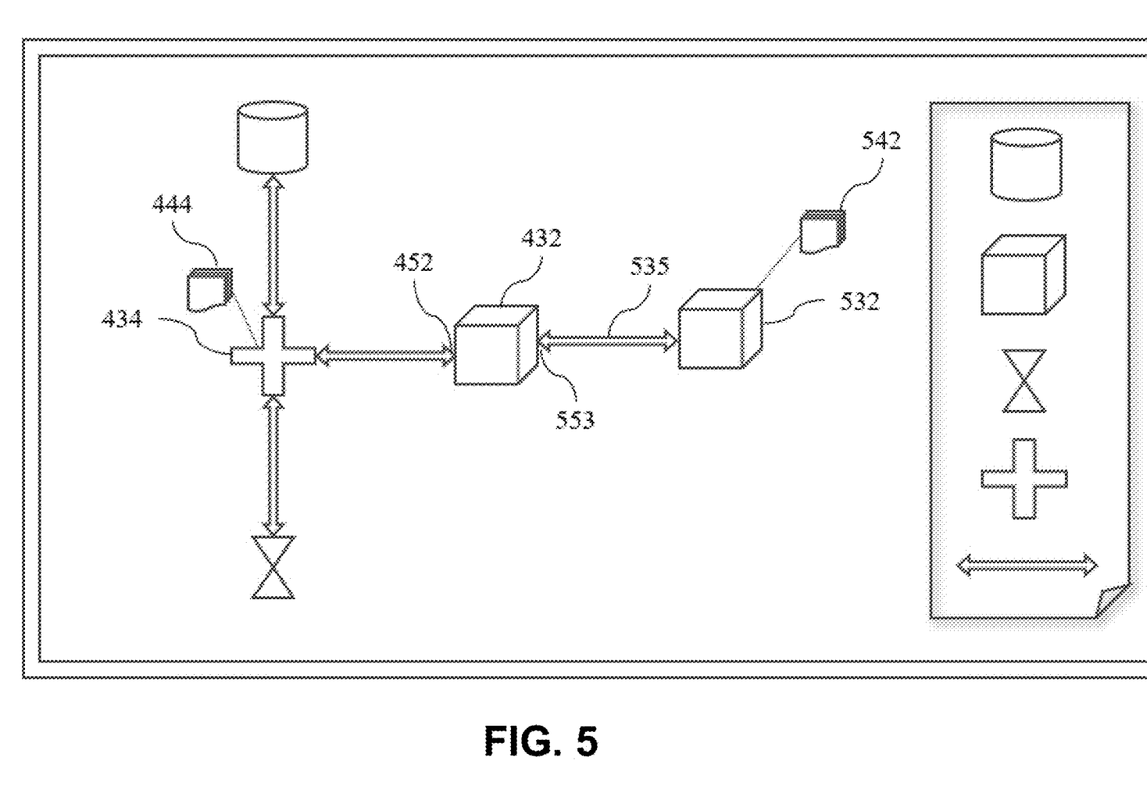
FIG. 5 represents a second pump element imported into the simulation canvas according to some embodiments.

FIG. 5 represents a second pump element 532 imported into the simulation canvas 120 according to some embodiments. In some embodiments, a segment 535 connects the second pump element 532 to the first pump element 432. In this scenario, first pump element 432 receives transmitted parameter inputs from both the manifold element 434 at pump outlet 452 and the second pump element 532 at pump inlet 553 according to some embodiments. As evident from FIG. 5, in some embodiments, each element can comprise multiple parameter inputs from multiple other elements. In terms of system analysis, if an operator attempts to toggle first pump 432 from an off to an on configuration, the system is configured to compare all transmitted parameters to an operations table (described in detail later) to determine if the actuation should be allowed according to some embodiments. In some embodiments, if the second pump element 532 is off, it will transmit a pressure and/or flowrate, as non-limiting examples, less than expected to pump inlet 553, which in this case results in an interlock.

By providing an analysis based on theoretical calculations instead of actual component status, the system is configured to carry forward the results of the theoretical calculation to the next downstream element. For example, the first pump element 432 updates an operational table with an interlock condition, but also, in some embodiments, transmits the theoretical calculation of the resulting actuation to the downstream manifold 434 and/or back to second pump element 532. In a system where both the first pump component and the second pump component are needed to overcome the head pressure from an elevated tank component, for example, the theoretical calculator is configured to provide the theoretical pressures and/or flowrates between the elements as if the actuation were to occur according to some embodiments. In some embodiments, the system acts as an element-to-element simulator in this respect. Advantageously, each element and segment can represent a future improvement on a system (or entirely new system) where elements and segments can be added to and existing system and the effects of the integration tested before the existing components are installed according to some embodiments. As the analysis is performed at each element using parameter inputs from other connected elements, the system saves computer resources by not needing to analyze every component in the system at once to perform a simulation. In some embodiments, one or more parameter inputs include historical parameter inputs, described in further detail below, which allows the system to simulate process conditions by providing elements with historical data for various conditions.

Figure 6:
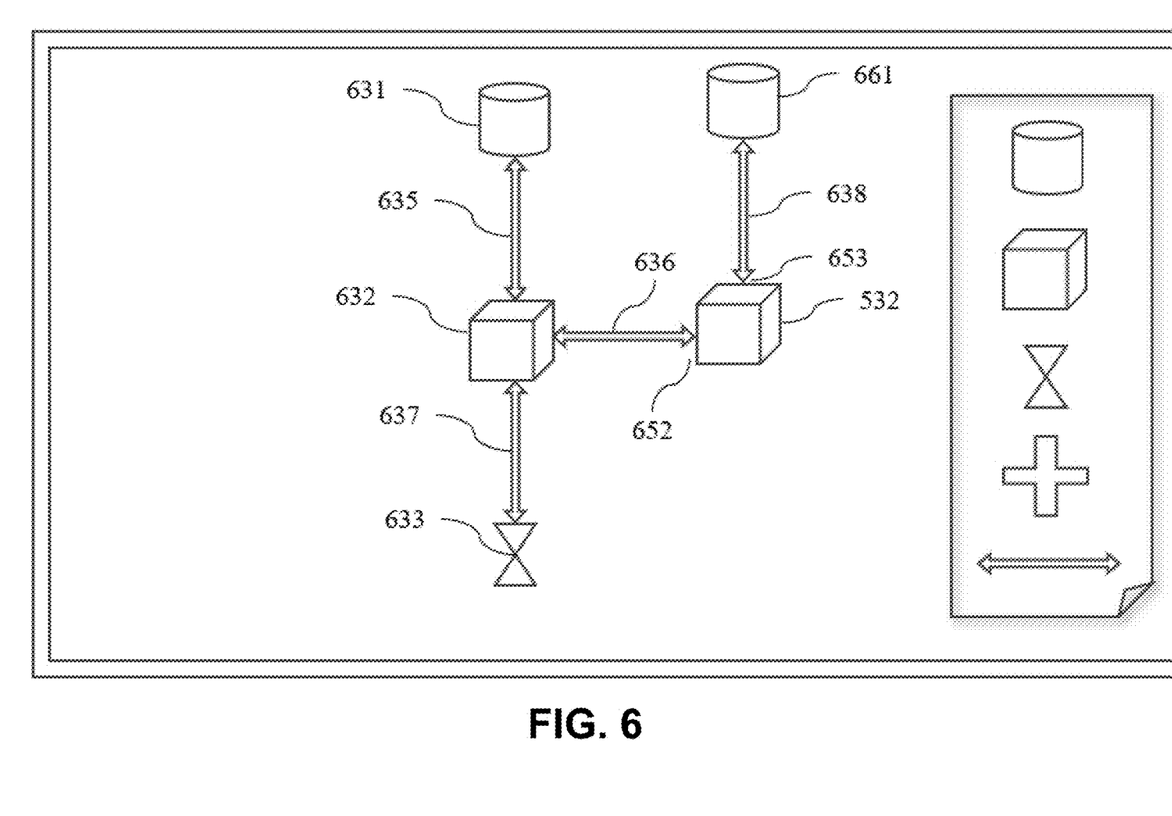
FIG. 6 illustrates the ability of the system to accept multiple inputs from various elements according to some embodiments.

FIG. 6 illustrates the ability of the system to accept multiple inputs from various elements according to some embodiments. In some embodiments, an element such as first pump element 632 may connected to a first tank element 631 via a segment 635 as well as a drain valve element 633 via segment 637. In some embodiments, this arrangement enables the first pump element 632 to act similar to a manifold element 134 in the since that a cumulative effect of all inputs are transmitted among all connected elements through segments 635, 636, and 637. In some embodiments, the theoretical analyzer performs similar calculations to the first pump element 632 as previously described for a manifold element 134, but this feature allows for a more accurate representation of a system's layout (i.e., if no actual manifold exists) according to some embodiments.

FIG. 6 also depicts a second tank element 661 imported into the simulation canvas 120 according to some embodiments. In some embodiments, although first pump element 632 does not receive parameter inputs directly from tank element 661, the parameter inputs from second pump element 532 transferred by segment 636 include the effects of second tank element 661 at the second pump element inlet 653 and outlet 652. As a non-limiting example, if the second tank element 661 is empty, one or more operational inputs for second pump element 532 may cause an interlock for second pump element 532, which is sent to both the second tank element 661 and first pump element 632. Therefore, in addition to receiving parameter inputs from second pump element 532 that include actual and/or theoretical values, the second pump element's interlock status is also transmitted. In addition, the second pump element's interlock status may be sent to an operational table, which is further described later according to some embodiments.

Figure 7:
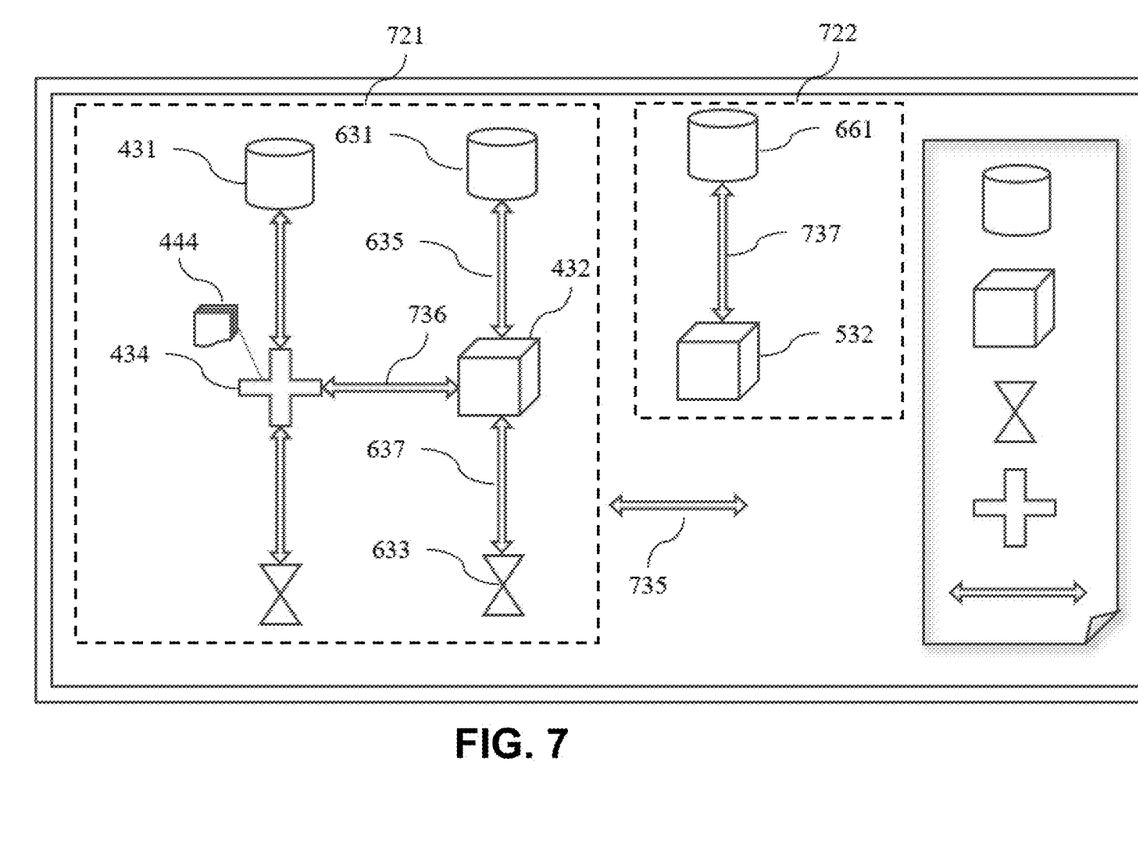
FIG. 7 demonstrates the effect of disconnecting two elements by removing a segment according to some embodiments.

FIG. 7 demonstrates the effect of disconnecting two elements by removing a segment according to some embodiments. In some embodiments, a segment 735 has been moved such that it no longer connects first pump 432 and second pump 532 according to some embodiments. In some embodiments, this scenario results in a break in the transmission of parameter inputs between first pump element 432 and second pump element 532. In essences, this scenario creates two separate simulated systems emphasized by dashed boxes 721 and 722 on the same simulation canvas 120 according to some embodiments. When a segment is removed breaking the connections between two elements, the system is configured to continue to transmit and/or display parameter inputs from elements with remaining connections without further programming according to some embodiments. This is useful when segment 735 may represent a pipe that is under maintenance, or perhaps a simulation of a component connected to first pump element 432 is desired to be tested, but existing second tank element 661 and second pump element 532 still need to be monitored and controlled according to some embodiments.

In some embodiments, the system includes one or more operations tables that comprises one or more sub-tables configured to store one or more operational states associated with each element on one or more non-transitory computer readable media. In some embodiments, the one or more operational states are associated with an element in the one or more operations table by a transaction ID. In some embodiments, in addition to analyzing parameter inputs received from adjacent elements, the system is configured to scan the one or more operations tables upon attempted actuation of the component associated with an element. In some embodiments, if an operational state of a component in the system does not meet operational criteria for an elements actuation command, the system is configured to prevent actuation of the element and/or send a notification of the element's prevention.

In some embodiments, the one or more operations tables are useful in multiple aspects. In some embodiments, the one or more operations tables are configured to enable multiple elements not directly connected by each other to share information about their respective operational states. In some embodiments, operational states include one or more parameter inputs and/or one or more actual states (e.g., on, off, % power, etc.). The one or more operational tables include one or more actual tables for actual process environments, and/or one or more simulation tables for simulated environment. In some embodiments, the one or more simulation operational tables include copies of at least a portion of one or more actual tables. In some embodiments, the one or more operational tables are populated using one or more of a component's actual state, historical state, and/or theoretical state.

The use of operational tables further improves computer efficiency by reducing the amount of time it takes to determine a process abnormality. In some embodiments, using the segmental analysis described here, each element in the line receives input parameters from an adjacent segment. In some embodiments, this continues throughout all elements connected by segments until the entire system has been solved. However, this segmental analysis may delay the calculation of an abnormal condition between distal elements that comprise multiple elements in-between.

Figure 8:
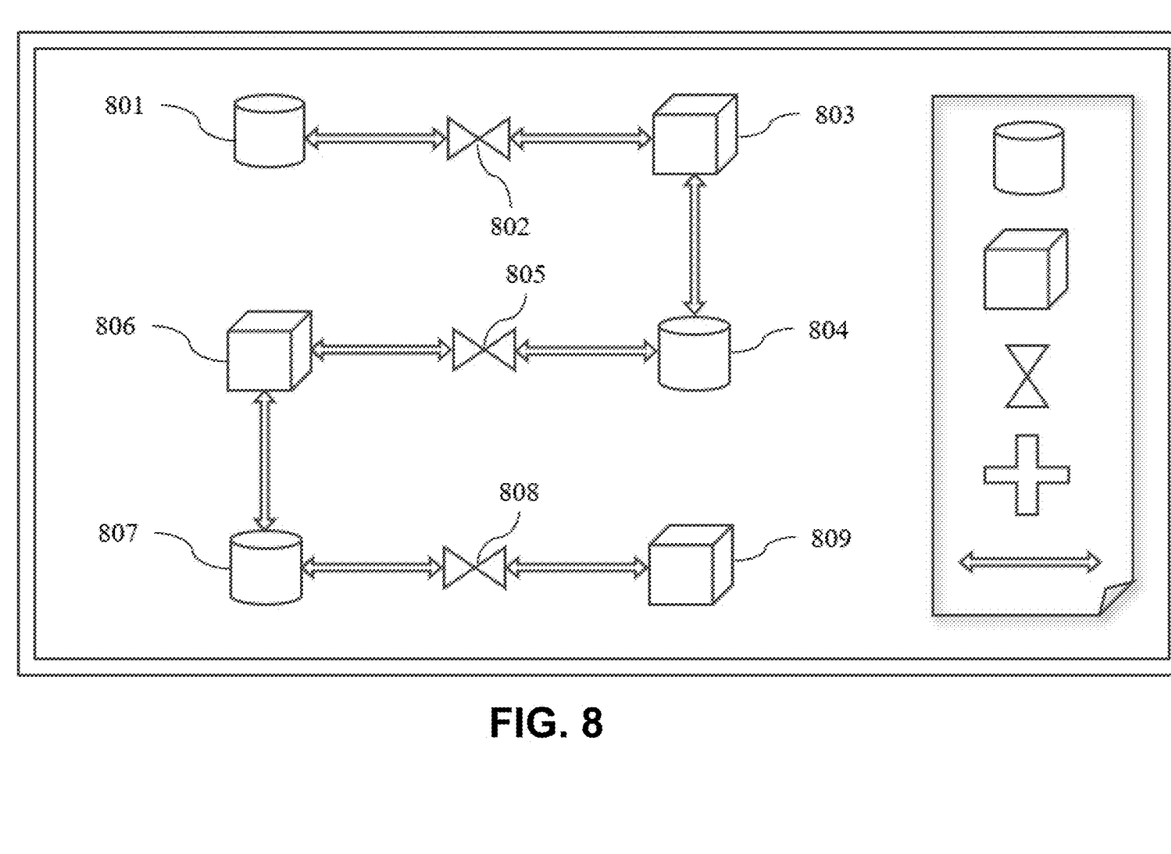
FIG. 8 shows a non-limiting example arrangement where distal elements include multiple elements in-between according to some embodiments.

FIG. 8 shows a non-limiting example arrangement where distal elements include multiple elements in-between according to some embodiments. In some embodiments, element 801 is separated from element 809 by eight intervening elements 802-808. As previously described, an actuation (i.e., an attempt at a state change; any reference to an actuation is also a reference to a state change) of element 809 sends input parameters to element 808 and so on through the chain until it reaches element 801. However, in some embodiments, as a non-limiting scenario, the actuation of element 809 is configured to open all valves 802, 805 and 808 at the same time, but element 802 is fails to open, element 802 sends its condition to each element along the line until reaching element 809. In some embodiments, element 803 would receive the closed state and associated parameter inputs from element 802 and use those inputs in calculations for a predictive state. In some embodiments, that predictive state may be an interlock, but the interlock and parameter inputs for element 803 are transmitted to element 804 and that procedure repeated until reaching element 809. In some embodiments, it is an immediate interlock of element 809 that is desired in this situation, but it may be delayed long enough (e.g., half a second) to allow element 809 to at least start the actuation command for element 809 because the theoretical calculations from the line-up are acceptable. In some embodiments, the failure of element 802 may not be evident until the process flow starts and/or multiple components associated with each element have changed states.

In some embodiments, to prevent an actual excursion, the system is configured to enable one or more component computers to scan the operations table before, during, and/or after executing a state change command. In some embodiments, the system is configured to enable multiple elements and/or multiple components to be linked to the same operational table using at least partially matching transaction IDs. As a non-limiting example, in some embodiment, the corresponding components for elements 802, 803, 805, 806, 808 and 809 include one or more sensors sending actual data to one or more component computers. In some embodiments, the one or more component computers comprise one or more controllers. In some embodiments, the one or more component computers are one or more programmable logic controllers (PLCs). In some embodiments, each element 802, 803, 805, 806, 808 and 809 may share a common transaction ID and/or a common portion of a transaction ID (e.g., a prefix such as fill tank). In some embodiments, the system is configured to enable all component computers to scan the one or more operational tables to determine the actual state of each of the components associated with the transaction ID for elements 802, 803, 805, 806, 808 and 809. In this case, the component computer for element 809 scans the operation table and determines that element 802 has a failure attached to the common transaction ID. In some embodiments, this results in the immediate termination of the entire fill tank line-up and the return to all components to an original and/or failsafe state.

Therefore, in some embodiments, the system protects from abnormal conditions by both checking the theoretical result of a particular element actuation and/or line-up and/or by enabling component computers to check one or more operational tables to determine an actual state of distal element with at least a partially matching transaction ID before, during, and/or after a state change command occurs.

In some embodiments, the one or more parameter inputs include historical inputs. In some embodiments, the historical inputs include historical data stored on one or more non-transitory computer readable media according to some embodiment. In some embodiments, the theoretical analyzer is configured to compare theoretical calculations of the result of a calculation to historical results upon an attempted actuation of a component by selection of its corresponding element. In some embodiments, the system is configured to prevent actuation of a component if one or more portions of the theoretical calculation deviates from the historical data by a predetermined amount. In some embodiments, the system is configured to identify trends in the process by analyzing one or more of theoretical inputs, actual inputs, and historical inputs according to some embodiments. In some embodiments, the system is configured to generate and/or display one or more visual representations (e.g., charts, graphs) when a change in steady state of one or more components is detected by the system. In some embodiments, the system is configured to use one or more of theoretical inputs, actual inputs, and historical inputs as training samples to artificial intelligence to train the system to identify process anomalies.

Figure 9:
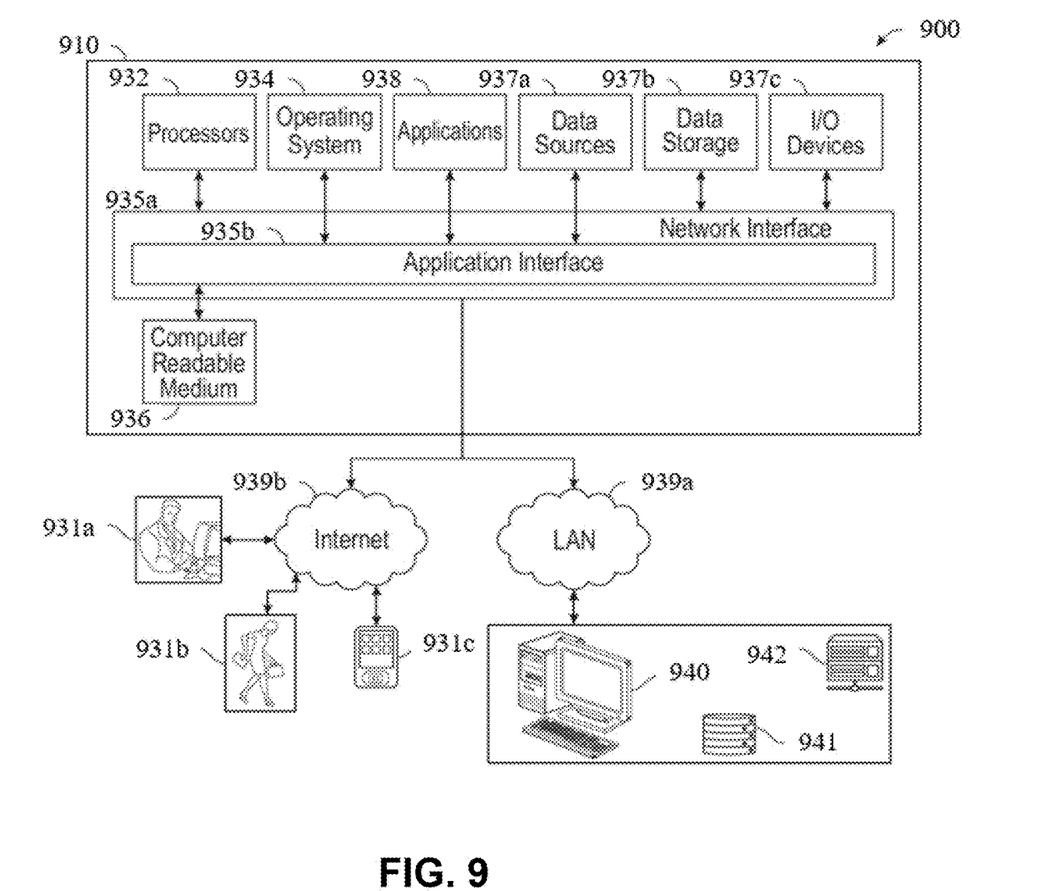
FIG. 9 illustrates a computer system enabling or comprising the systems and methods in accordance with some embodiments of the system.

FIG. 9 illustrates a computer system 910 enabling or comprising the systems and methods in accordance with some embodiments of the system. In some embodiments, the computer system 910 can operate and/or process computer-executable code of one or more software modules of the aforementioned system and method. Further, in some embodiments, the computer system 910 can operate and/or display information within one or more graphical user interfaces (e.g., HMIs) integrated with or coupled to the system.

In some embodiments, the computer system 910 can comprise at least one processor 932. In some embodiments, the at least one processor 932 can reside in, or coupled to, one or more conventional server platforms (not shown). In some embodiments, the computer system 910 can include a network interface 935*a* and an application interface 935*b* coupled to the least one processor 932 capable of processing at least one operating system 934. Further, in some embodiments, the interfaces 935*a*, 935*b* coupled to at least one processor 932 can be configured to process one or more of the software modules (e.g., such as enterprise applications 938). In some embodiments, the software application modules 938 can include server-based software and can operate to host at least one user account and/or at least one client account, and operate to transfer data between one or more of these accounts using the at least one processor 932.

With the above embodiments in mind, it is understood that the system can employ various computer-implemented operations involving data stored in computer systems. Moreover, the above-described databases and models described throughout this disclosure can store analytical models and other data on computer-readable storage media within the computer system 910 and on computer-readable storage media coupled to the computer system 910 according to various embodiments. In addition, in some embodiments, the above-described applications of the system can be stored on computer-readable storage media within the computer system 910 and on computer-readable storage media coupled to the computer system 910. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 910 can comprise at least one computer readable medium 936 coupled to at least one of at least one data source 937*a*, at least one data storage 937*b*, and/or at least one input/output 937*c*. In some embodiments, the computer system 910 can be embodied as computer readable code on a computer readable medium 936. In some embodiments, the computer readable medium 936 can be any data storage that can store data, which can thereafter be read by a computer (such as computer 940). In some embodiments, the computer readable medium 936 can be any physical or material medium that can be used to tangibly store the desired information or data or instructions and which can be accessed by a computer 940 or processor 932. In some embodiments, the computer readable medium 936 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 936 can transmit or carry instructions to a remote computer 940 and/or at least one user 931, including a router, private or public network, or other transmission or channel, both wired and wireless. In some embodiments, the software application modules 938 can be configured to send and receive data from a database (e.g., from a computer readable medium 936 including data sources 937*a* and data storage 937*b* that can comprise a database), and data can be received by the software application modules 938 from at least one other source. In some embodiments, at least one of the software application modules 938 can be configured within the computer system 910 to output data to at least one user 931 via at least one graphical user interface rendered on at least one digital display.

In some embodiments, the computer readable medium 936 can be distributed over a conventional computer network via the network interface 935*a* where the system embodied by the computer readable code can be stored and executed in a distributed fashion. For example, in some embodiments, one or more components of the computer system 910 can be coupled to send and/or receive data through a local area network ("LAN") 939*a* and/or an internet coupled network 939*b* (e.g., such as a wireless internet). In some embodiments, the networks 939*a*, 939*b* can include wide area networks ("WAN"), direct connections (e.g., through a universal serial bus port), or other forms of computer-readable media 936, or any combination thereof.

In some embodiments, components of the networks 939a, 939b can include any number of personal computers 940 which include for example desktop computers, and/or laptop computers, or any fixed, generally non-mobile internet appliances coupled through the LAN 939a. For example, some embodiments include one or more of personal computers 940, databases 941, and/or servers 942 coupled through the LAN 939a that can be configured for any type of user including an administrator. Some embodiments can include one or more personal computers 940 coupled through network 939b. In some embodiments, one or more components of the computer system 910 can be coupled to send or receive data through an internet network (e.g., such as network 939b). For example, some embodiments include at least one user 931a, 931b, is coupled wirelessly and accessing one or more software modules of the system including at least one enterprise application 938 via an input and output ("I/O") 937c. In some embodiments, the computer system 910 can enable at least one user 931a, 931b, to be coupled to access enterprise applications 938 via an I/O 937c through LAN 939a. In some embodiments, the user 931 can comprise a user 931a coupled to the computer system 910 using a desktop computer, and/or laptop computers, or any fixed, generally non-mobile internet appliances coupled through the internet 939b. In some embodiments, the user can comprise a mobile user 931b coupled to the computer system 910. In some embodiments, the user 931b can connect using any mobile computing 931c to wireless coupled to the computer system 910, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of process modeling by improving process predictions using segmental analysis. The disclosure describes the specifics of how a machine including one or more computers comprising one or more processors and one or more non-transitory computer implement the system and its improvements over the prior art. The instructions executed by the machine cannot be performed in the human mind or derived by a human using a pin and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide a technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the system are useful machine operations. The system also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the system can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Although method operations are presented in a specific order according to some embodiments, the execution of those steps do not necessarily occur in the order listed unless a explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the system has been described above in connection with particular embodiments and examples, the system is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the system are set forth in the following claims.

I claim:

1. A system for modelling an industrial process using segmental analysis comprising:
   one or more computers comprising one or more processors and one or more computer readable media, the one or more computer readable media comprising instructions stored thereon that when executed cause the one or more computers to:
   create, by the one or more processors, a graphical user interface (GUI) comprising a simulation canvas;
   display, by the one or more processors, a model library comprising one or more model objects comprising a first element, a second element and a third element and/or a first segment and a second segment, each of the elements and segments being selectable by a user via the GUI;
   import, by the one or more processors, a selection of one of the first, second or third elements and/or one of the first or second segments from the model library to the simulation canvas; and
   enable, by the one or more processors, a connection of one of the first or second segments to one of the first, second or third elements on the simulation canvas, each of the first, second and third elements being configured to send one or more parameter inputs to one or more other elements connected by one of the first or second segments, wherein when the first element is connected to the second element by the first segment and the second element is connected to the third element by the second segment, the system is configured to send a first parameter input at the first element to the second element but not the third element;
   receive, by the one or more processors, a first parameter input at the first element;
   determine, by the one or more processor, a second parameter input for the second element by analyzing the first element and the first parameter input to generate a theoretical input; and
   transmit, by the one or more processors, the determined second parameter to the second element using the first segment.

2. The system of claim 1,
   wherein each of the first, second and third elements are configured to receive one or more parameter inputs from one or more other elements connected by one or more segments.

3. The system of claim 1,
   wherein each of the first, second and third elements are configured to receive one or more parameter inputs only from one or more other elements connected by one or more segments.

4. The system of claim 1,
wherein the instructions further cause the one or more computers to:
generate, by the one or more processors, a theoretical analyzer;
wherein the theoretical analyzer is configured to use parameter data from the one or more parameter inputs to predict a theoretical result of a theoretical change in state of a process component linked to one of the one or more elements.

5. The system of claim 4,
wherein the theoretical change in state is a result of the user attempting to alter the state of at least one of the one or more elements via the graphical user interface.

6. The system of claim 4,
wherein the system is configured to compare the theoretical result to an operational parameter; and
wherein the system is configured to prevent a state alteration of the at least one of the one or more elements if the theoretical result is outside of the operational parameter.

7. The system of claim 6,
wherein the theoretical result comprises one or more of a pressure, a temperature, a flowrate, and a flow direction.

8. The system of claim 4,
wherein the one or more parameter inputs comprise one or more actual inputs; and
wherein the one or more actual inputs comprise one or more links configured to enable the user to connect the one or more model objects to one or more monitoring systems.

9. The system of claim 8,
wherein the system is configured to compare the one or more actual inputs to an operational parameter; and
wherein the system is configured to prevent a state change of the at least one of the one or more elements if the one or more actual inputs are outside of the operational parameter.

10. The system of claim 4,
wherein the theoretical analyzer is configured to send the theoretical result to other elements connected by adjoining segments before analysing any other element.

11. The system of claim 4,
wherein the system is configured to enable a state change attempt of multiple elements at once with a transaction command.

12. The system of claim 11,
wherein the transaction command comprises a transaction identification.

13. The system of claim 12,
wherein each of the multiple elements associated with the transaction command that share at least a part of the transaction identification.

14. The system of claim 13,
wherein the system is configured to check an operational table for an actual state of the multiple elements that share at least a part of the transaction identification.

15. The system of claim 14,
wherein the system is configured to check the operational table at one or more of before, during, and after the state change attempt has been made.

16. The system of claim 14,
wherein the system is configured to prevent a component state from changing and/or revert a current component state back to a previous component state if the actual state does not match an expected state.

17. The system of claim 1,
wherein the instructions are further configured to cause the one or more computers to:
create, by the one or more processors, an operational table;
send, by the one or more processors, an actual component state for each respective component of the one or more elements to the operational table;
compare, by the one or more processors, each actual component state to an expected component state for a state change command; and
prevent, by the one or more processors, the state change command if one or more actual component states do not match an expected component state for the state change command.

18. The system of claim 1,
wherein the first element includes a first actual component state;
wherein the third element includes a third actual component state; and
wherein upon a state change attempt of the first element the system is configured to transmit the first element parameter inputs to the second element connected to the first segment and compare the third actual component state to a third expected component state by using an operational table.

19. The system of claim 1,
wherein the one or more parameter inputs comprise one or more links configured to enable the user to connect the one or more model objects to a theoretical analyzer.

20. A system for modelling an industrial process using segmental analysis comprising:
one or more computers comprising one or more processors and one or more computer readable media, the one or more computer readable media comprising instructions stored thereon that when executed cause the one or more computers to:
create, by the one or more processors, a graphical user interface (GUI) comprising a simulation canvas;
display, by the one or more processors, a model library comprising one or more model objects comprise sing one or more elements and/or one or more segments selectable by a user via the GUI;
import, by the one or more processors, a selection of the one or more elements and/or the one or more segments from the model library to the simulation canvas; and
enable, by the one or more processors, a first connection of a first element to a second element by a first segment and a second connection of the second element to a third element by a second segment, the system being configured to send first element parameter inputs to the second element but not the third element based on the first element being indirectly connected to the third element.

* * * * *